April 25, 1933.         C. T. PFLUEGER         1,905,567
FLOATING BUG OR LURE
Filed Aug. 26, 1927
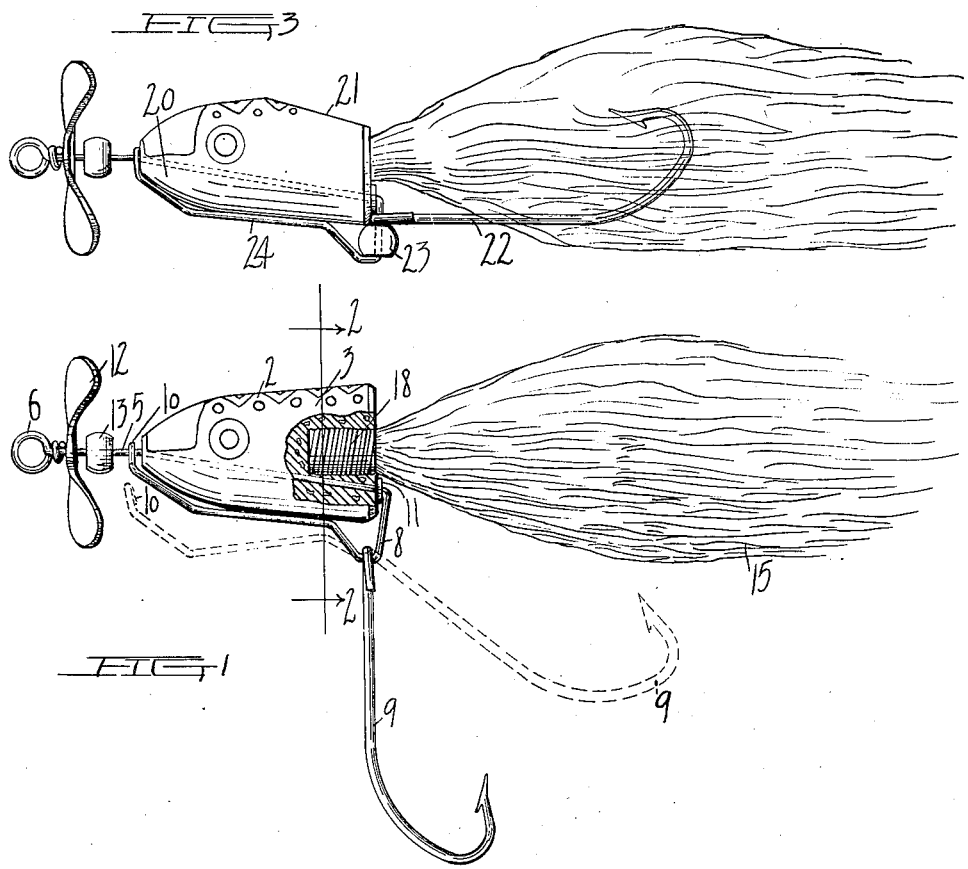
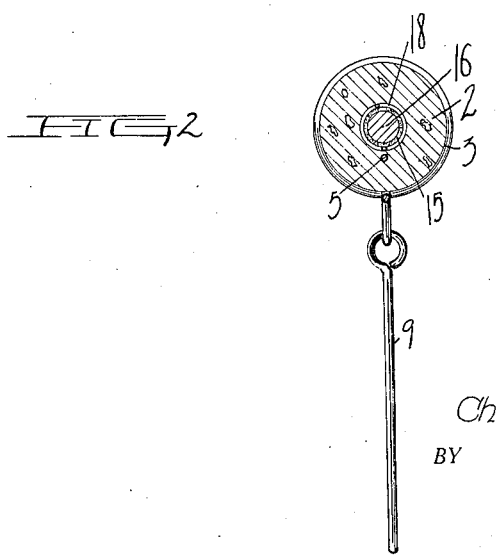
INVENTOR.
Charles T. Pflueger
BY Ely & Barrow
ATTORNEYS.

Patented Apr. 25, 1933

1,905,567

UNITED STATES PATENT OFFICE

CHARLES T. PFLUEGER, OF AKRON, OHIO, ASSIGNOR TO THE ENTERPRISE MANUFACTURING COMPANY, OF AKRON, OHIO, A CORPORATION OF OHIO

FLOATING BUG OR LURE

Application filed August 26, 1927. Serial No. 215,649.

This invention relates to a light floating bug or lure such as used in fly-rod casting. In the manufacture and design of this type of bait, it is essential that the weight be reduced as much as possible for ease and facility in casting. The present construction provides an extremely light lure with advantages and features of construction not found previously in lures of this general type. The lure shown and described herein has been manufactured in weights less than 6/100 of an ounce.

The objects of the present invention are to maintain a light lure and at the same time provide for removability of the hook and ease in riding over weeds. In prior constructions of this type, the hook and the lure have been manufactured so that they are inseparable. By the present invention the hook may be removed and replaced without destroying the main body of the lure. In prior constructions of this type the hook has always been so arranged that it will catch in the weeds. In the present construction the hook will travel over the surface of the weeds and will not become entangled. The lure also combines a light metal spinner which adds to the attractiveness of the lure. It is also an object to enable the lure to be manufactured more cheaply and easily than former lures of this type.

In the drawing, the preferred form of the invention is shown, it being possible to modify and alter the specific details thereof without departing from the principles and purposes of the invention.

Figure 1 is a side view of the lure, a portion of the body being broken away to show the interior construction;

Figure 2 is a cross-section on the line 2—2 of Figure 1; and

Figure 3 is a side view of a modified form of bait.

The lure comprises a body portion 2 which supports and carries the various parts of the device. This is preferably made from a light wood so as to reduce the weight of the lure and add to its buoyancy in the water. For this purpose in the example illustrated, cork has been used, although other light or porous materials may be employed. This body is given a coating of water-repellent paint 3, preferably a celluloid paint, which is decorated in any fanciful design with bright and contrasting colors to enhance the attractiveness of the bait.

Passed through the body of the bait, preferably in a diagonal downward direction, is a light wire 5, the forward end of which is provided with an eye 6 for attachment to the line. At the point where the wire passes out of the rear of the body, it is bent outwardly and downwardly to form a loop 8 spaced from the body to receive and suspend the hook 9. The balance of the wire is passed along the body and provided with a terminal hook 10 which is passed about the main portion of the wire at the top of the body. When it is desired to remove or replace the hook 9, the end of the wire is disconnected, as shown in dotted lines, and the hook can be easily removed. At the point where the wire emerges from the body, a small washer 11 may be cemented to the painted surface of the body so as to prevent the wire from pulling through the light cork body. The off-center location of the wire and the weight of the hook act as ballast to keep the lure in its proper position in the water.

On the front of the bait body is mounted a light metal spinner 12 and a bead 13, usually of bright colored glass, these elements adding to the attractiveness of the bait and the bead 13 further operating as a spacer for the spinner.

To further add to the attractiveness of the fly, artificial fly tying material, such as a bunch of hair, feathers, or buck tail 15 is attached to the rear of the bait, the elements of the buck tail being assembled upon a plug 16 and tightly wrapped as shown at 18. The buck tail assembled upon the plug is then inserted in an opening provided for the reception thereof in the rear of the bait body, a little cement being sufficient to hold the buck tail within the bait body.

In addition to the features which have been described, it will be observed that the hook hangs loosely from the lure body with the point directed rearwardly. In drawing through the water, the hook will assume the position shown in dotted lines with the point upwardly, and when the lure is drawn through weeds or grass it will rise still further and skim over the surface of the weeds. This will prevent fouling of the hook and will render the lure practically weedless. In baits of this type in use heretofore, the lure body has been mounted directly upon the hook which is turned downwardly and thereby fouls the weeds and grass over which they are drawn.

The advantages of the lure shown here are its lightness, ease of disassembly to replace hooks and weedless characteristics which make the invention a valuable addition to the art of fly-casting, for which the lure is particularly designed and adapted.

In the modified form of the invention shown in Figure 3, the bait body 20 is cut away as at 21 so as to give better exposure to the hook. In this form, while the hook 22 is given a degree of flexibility, it is maintained in substantially horizontal position by a washer 23 received over the wire 24, which is otherwise similar to the form shown in the other views. The washer may be a disk of metal or rubber which is sealed in the loop but can be passed over the wire to disassemble the hook and the lure. The weedless qualities of the lure may be increased by the arrangement shown.

What is claimed is:

A fish lure comprising a light buoyant body and a wire passing through the body from end to end, a hook attached to the wire in position to trail behind the body with its point directed upwardly, and a stop on the wire to flexibly maintain the hook in substantially horizontal position.

CHARLES T. PFLUEGER.